United States Patent [19]
Kulha et al.

[11] Patent Number: 5,745,045
[45] Date of Patent: Apr. 28, 1998

[54] OPTICAL ANTI-THEFT SYSTEM

[75] Inventors: Steven P. Kulha, Shelby Township; Jeffrey T. Kelley, Plymouth; Jeffrey L. Kulczycki, Westland; Qingfeng Tang, Dearborn Heights, all of Mich.

[73] Assignee: United Technologies Automotive, Inc., Dearborn, Mich.

[21] Appl. No.: 522,744

[22] Filed: Sep. 1, 1995

[51] Int. Cl.$^6$ .................. E05B 49/02; B60R 22/00; H01H 27/00
[52] U.S. Cl. .................. 340/825.31; 340/825.34; 340/825.32; 340/825.3; 307/10.2; 307/10.4; 307/10.5; 70/278; 235/382
[58] Field of Search .................. 340/825.31, 825.34, 340/825.3, 825.32; 307/10.1, 10.2, 10.3, 10.4, 10.5; 70/277, 278; 235/382

[56] References Cited

U.S. PATENT DOCUMENTS

| | | | |
|---|---|---|---|
| 3,767,002 | 10/1973 | Gillund | 180/102 |
| 4,298,792 | 11/1981 | Granholm et al. | 235/375 |
| 4,645,233 | 2/1987 | Bruse et al. | 280/808 |
| 4,673,914 | 6/1987 | Lee | 307/10.4 |
| 4,749,873 | 6/1988 | Mutoh et al. | 307/10.2 |
| 4,751,396 | 6/1988 | Daigle et al. | 307/10 AT |
| 5,043,593 | 8/1991 | Tsutsumi et al. | 307/10.2 |
| 5,119,065 | 6/1992 | Wiehagen | 340/428 |
| 5,280,267 | 1/1994 | Reggiani | 340/426 |
| 5,394,135 | 2/1995 | Stadler | 340/426 |

FOREIGN PATENT DOCUMENTS

| | | |
|---|---|---|
| 0075078 | 3/1983 | European Pat. Off. . |
| 0257808 | 3/1988 | European Pat. Off. . |
| 0437101 | 7/1991 | European Pat. Off. . |
| 0666393 | 8/1995 | European Pat. Off. . |
| 3305614 | 8/1984 | Germany . |
| 59177687 | 10/1984 | Japan . |
| 2264750 | 9/1993 | United Kingdom . |
| WO9305987 | 4/1993 | WIPO . |

*Primary Examiner*—Michael Horabik
*Assistant Examiner*—Yonel Beaulieu
*Attorney, Agent, or Firm*—Ozer M. N. Teitelbaum

[57] ABSTRACT

An optical anti-theft system incorporates a member having a plurality of reflective surfaces. The plurality forms a pattern corresponding with the security code. The system additionally incorporates a base for receiving the member. The base incorporates a light source for generating a light beam to illuminate the plurality of reflective surfaces, and a light detector for sensing the illuminated plurality of reflective surfaces and for initiating a security function in response to the sensed illuminated plurality of reflective surfaces having the pattern.

26 Claims, 4 Drawing Sheets

OPTICAL ANTI-THEFT SYSTEM

FIELD OF THE INVENTION

This invention relates to a optical anti-theft system ("OATS").

BACKGROUND OF THE INVENTION

The combination of lock and key is well known in the theft deterrent arts. Traditionally, keys comprise a series of notches and grooves which aligns with a corresponding lock's tumblers to latch and unlatch the locking mechanism. By so doing, access may then be gained to the respectively secured enclosed area or space. Locking mechanisms as such are employed in vehicles, buildings, doors, safes, desk drawers and jail cells.

Similarly, the use of a lock and key combination as a switching mechanism is also known. In such a configuration, by latching and unlatching the lock, the switch may be enabled and disabled accordingly. An steering column ignition switch is but one application of a lock and key combination in a switching mechanism.

While both of the above applications provide restricted access in one form or another, the resultant security afforded is limited by the quality of the locking mechanism. In view of this relationship, the level of sophistication of the lock and key combination is of critical importance in reducing unauthorized access.

Reducing unauthorized access is of particular importance to the automotive industry. Car theft has become an issue of significance in the United States, as well as in some European countries. As a result, there is a growing impetus on the part of automobile manufacturers to provide added levels of security to traditional locking mechanisms without a substantial increase in cost, weight, or energy requirements.

Thus, a demand exists for a locking mechanism having an added level of security. A need further exists for a theft deterrent system which is passive in nature, inexpensive and lightweight.

SUMMARY OF THE INVENTION

The primary advantage of the present invention is to overcome the limitations of the prior art.

A further advantage of the present invention is to provide a theft deterrent system having additional security features which are passively realized.

Another advantage of the present invention is to provide a theft deterrent system having additional security features which is inexpensive and lightweight in nature.

In order to achieve the advantages of the present invention, an optical anti-theft system having a security code is disclosed. The optical anti-theft system comprises a member having a plurality of reflective surfaces. The plurality forms a pattern corresponding with the security code. The system additionally comprises a base for receiving the member. The base comprises a light source for generating a light beam to illuminate the plurality of reflective surfaces, and a light detector for sensing the illuminated plurality of reflective surfaces and for initiating a security function in response to the sensed illuminated plurality of reflective surfaces having the pattern.

These and other advantages and objects will become apparent to those skilled in the art from the following detailed description read in conjunction with the appended claims and the drawings attached hereto.

BRIEF DESCRIPTION OF THE DRAWINGS

The present invention will be better understood from reading the following description of non-limitative embodiments, with reference to the attached drawings, wherein below.

It should be emphasized that the drawings of the instant application are not to scale but are merely schematic representations and are not intended to portray the specific parameters or the structural details of the invention, which can be determined by one of skill in the art by examination of the information herein.

DESCRIPTION OF THE PREFERRED EMBODIMENT

Figure 1A:
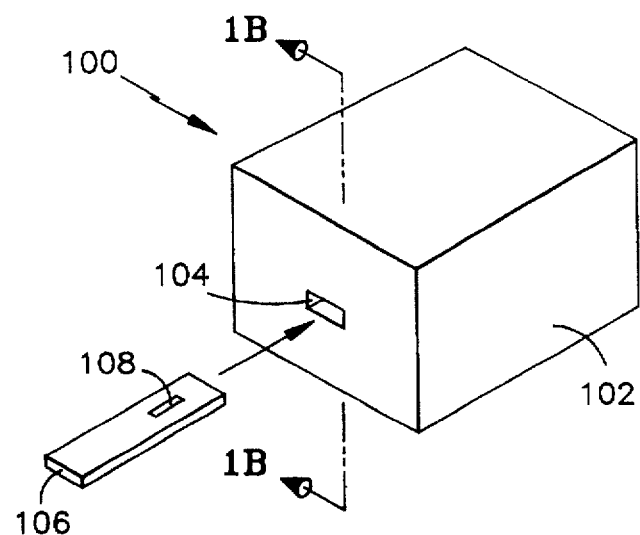
FIG. 1(a) and 1(b) illustrate a first embodiment of the present invention.
Figure 1B:
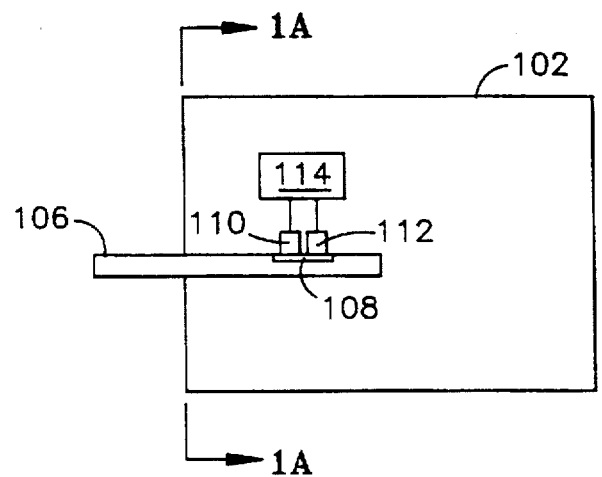
Figure 2:
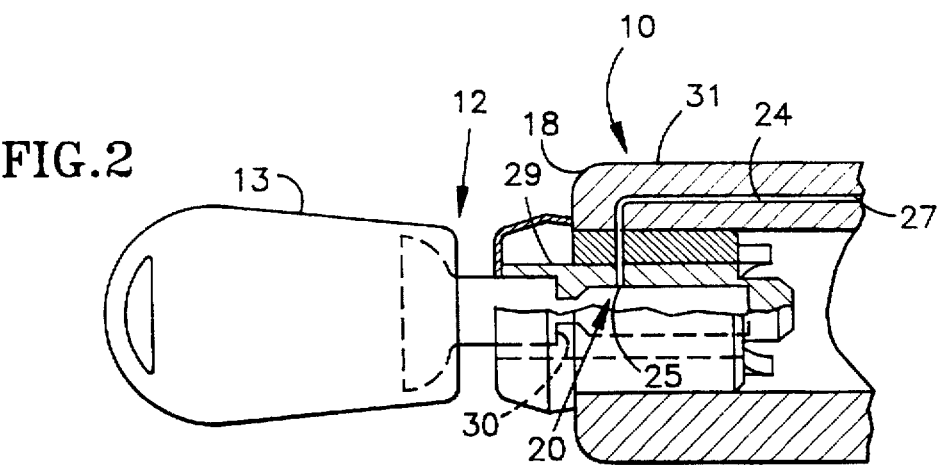
FIG. 2 illustrates the preferred embodiment of the present invention.

Referring to FIGS. 1(a) and 1(b), a first embodiment of an optical anti-theft system 100 is illustrated. To enable a first level of security, system 100 has a preselected security code stored in a memory system (not shown). This security code may be user programmable, manufacturer fixed, or based on an encryption technique.

System 100 comprises two essential elements; a member 106 and a base 102. Member 106 and base 102 may comprise various materials, configurations and shapes. In one embodiment of the present invention, member 106 comprises a key, while base 102 is a lock cylinder to provide a first level of security. Thus, it should be apparent to one of ordinary skill in the art that such a locking arrangement may be employed as a vehicle door lock, a vehicle steering column ignition lock, an vehicle engine controller switch, a vehicle starter switch, an entrance door lock to a building, a safe lock, an improved optical card reader, a desk drawer lock and the like, to name a few.

Member 106 comprises a plurality of reflected surfaces 108 which form a pattern. To further limit authorized access to selected members, this pattern corresponds with the security code of system 100. However, this pattern may comprise additional information, including personal user data, such as medical information, or temperature and lighting presets information for home, seating and mirror positions, temperature settings and radio station selections for the car.

The plurality of reflected surfaces minimally comprise a first and second reflective surface. The first reflective surface, when illuminated by a light beam, reflects the light at a first reflectivity, and as such, represents a first logic level, such as a logic high or one. Similarly, the second reflective surface reflects the light at a second reflectivity in the face of a light beam. This second reflectivity accordingly represents a second logic level, such as a logic low or zero.

Base 102 is designed to securely fit and adaptably receive member 106 though a mouth 104 and a passageway. Base 102 comprises a light source 110 for generating a light beam.

Base 102 further comprises a light detector 112 for detecting the reflections resulting from the light beam interacting with member 106. Moreover, base 102 also comprises a comparator 114 for comparing the detected reflections with the security code of system 100 stored its memory. In a further embodiment of the present invention, comparator 114 is a microcontroller which comprises a memory for storing the security code, and is further coupled with light source 110 for controlling the operation of system 100.

Upon inserting member 106 into mouth 104 and base 102, light source 110 illuminates reflected surfaces 108. The reflections resulting thereby are subsequently detected by detector 112. Comparator 114, coupled with detector 112, functionally compares the detector output with the stored security code. In response to the pattern of reflected surfaces matching the corresponding security code, comparator 114 initiates a security function. Depending on the application of system 100, this security function may include arming an alarm, disarming an alarm, latching or unlatching a locking mechanism.

In the preferred embodiment, a third reflective surface is also incorporated for reflecting an applied light beam at a third reflectivity. The third reflective surface represents an off position. This off position thereby insures that the plurality of illuminated reflective surfaces of system 100 are correctly sensed by a subsequent light detector. Moreover, third reflective surface creates a home position which substantially eliminates false triggering to reduce errors. Of most significance, however, by incorporating the third reflective surface, the insertion speed is made substantially irrelevant with respect to reading speed of the member 106 by eliminating synchronicity requirements. Thus, the reading speed of system 100 is made solely dependent on the power and speed of the microcontroller. This aspect can be attributed to the unlimited number of bits configured consecutively utilizing the third reflective surface as a home position.

The above detailed plurality of reflective surfaces may be formed by various means apparent to one of ordinary skill in the art. In one embodiment of the present invention, the reflective surfaces are formed on a reflective supportive substrate comprising polished aluminum. Alternatively, the reflective surfaces are formed on a reflective supportive substrate are ground into a machined material at different depths to vary the distance thereby created between the surface and a subsequent light detector. In a further alternate embodiment, the reflective surfaces are formed on a non-reflective supportive substrate. The reflective surfaces may be realized by several known process steps including holographic recording, polishing, or painting. Moreover, the reflective surfaces may also be formed attaching a data strip having the appropriate number of reflectivities superjacent the substrate. However, the reflective surfaces photolithography and etching a reflective material.

Referring to FIGS. 2, 3(a), 3(b) and 4, the preferred embodiment of an optical anti-theft system 10 of the present invention is illustrated. System 10 comprises a key 12 and a lock assembly 18 for receiving key 12. Key 12 latches and unlatches locking assembly 18. In so doing, the key 12 and lock assembly 18 combination functionally realizes a locking mechanism alone, or a locking switch. The resulting locking mechanism may be employed in a vehicle as a door lock or a steering column ignition switch.

Figure 3A:
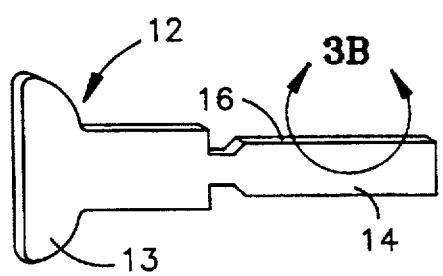
FIGS. 3(a) and 3(b) illustrate an enlarged view of a first aspect of the present invention.

Referring to FIG. 3(a), key 12 is shown in detail. Key 12 comprises an array of reflective surfaces 16 formed on a metal shank or substrate 14. Key 12 further comprises a head 13. In an alternate embodiment of the present invention, head 13 comprises a plastic insulating material.

To further limit authorized access to selected members, the array of reflective surfaces 16 comprises a pattern corresponding with a security code for system 10. The pattern preferably comprises an encrypted message, such as an encoded vehicle identification number. However, it should be noted that other information, including personal user data, such as medical information, or temperature and lighting presets information for home, seating and mirror positions, temperature settings and radio station selections for the car may also be incorporated.

Figure 3B:
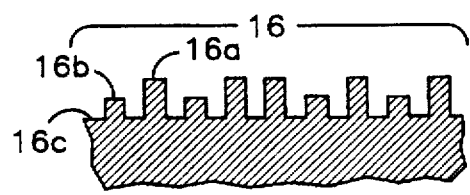

Referring to FIG. 3(b), an enlarged view of the array of reflective surfaces 16 is depicted. The array of reflected surfaces 16 comprises a first, second and third reflective surface, 16(a), 16(b) and 16(c), respectively. First reflective surface, 16(a), when illuminated by a light beam, reflects the light at a first reflectivity, and as such, represents a first logic level, such as a logic high or one. Similarly, second reflective surface 16(b) reflects the light at a second reflectivity in the face of a light beam. This second reflectivity accordingly represents a second logic level, such as a logic low or zero. Moreover, third reflective surface 16(c) is also incorporated for reflecting an applied light beam at a third reflectivity. The third reflective surface represents an off position. This off position thereby insures that the array of illuminated reflective surfaces of system 10 are correctly sensed by a subsequent light detector.

Once again, the array of reflective surfaces formed on substrate 14 may be fabricated by various means apparent to one of ordinary skill in the art. In one embodiment of the present invention, reflective surfaces 16 are formed on a reflective supportive substrate comprising polished aluminum. Alternatively, reflective surfaces 16 are formed on a reflective supportive substrate are ground into a machined material at different depths to vary the distance thereby created between the surface and a subsequent light detector. In a further alternate embodiment, reflective surfaces 16 are formed on a non-reflective supportive substrate. Reflective surfaces 16 may be realized by several known process steps including holographic recording, polishing, or painting. Moreover, reflective surfaces 16 may also be formed attaching a data strip having the appropriate number of reflectivities superjacent the substrate. However, reflective surfaces 16 photolithography and etching a reflective material.

Referring back to FIG. 2, locking mechanism 18 is designed to securely fit and adaptably receive key 12. Mechanism 18 comprises an outer housing 31 from which a fiber optic cable 24 is positioned therethrough. This may be realized by a bore 27 through outer housing 31 to provide space within housing 31 for cable 24. Lock 18 also comprises a passageway, enclosed by a casing 29, for receiving key 12. This passageway comprises an end stop 30 for securing key 12. Casing 29 includes a spacing for receiving a tip 25 of fiber optic cable 24 such that the cable is in optical communication with the array of reflective surfaces 16 of key 12.

As has been generally described above and will be understood in greater detail below, the array of reflective surfaces 16 are illuminated by a light source (not shown) transmitting a light beam over cable 24 and through tip 25. As a result of the incident light beam interacting with array 16, an equal number of reflections are accordingly generated. These reflections are transmitted back through tip 25 and fiber optic cable 24 to a light detector (not shown). The light detector analyzes the pattern associated with the reflections received. This information is then processed by a microcontroller (not shown) for comparing the detected light pattern with a stored security code, such as a vehicle identification number, encoded or otherwise. In response to matching the preset code with the detected pattern, the microcontroller generates a control signal to initiate a security function such as arming or disarming a vehicle alarm, and/or latching or unlatching a vehicle lock.

To realize both light source and generator functions, system 10 preferably comprises a line of sight reader 20. Reader 20 comprises fiber optic cable bundle 24 for transmitting light from a light source to array 16, and for receiving the resultant reflected light from array 16 for delivery to a light detector where its intensity is measured or detected. Reflected light in the form of a signal is then conditioned through system electronics, detailed below, to grade the reflected signal into three levels.

It should be noted that system 10 is preferably designed for a standard automotive ignition and/or door lock system. In such and application, having an narrowly accessible and confined space for adaptably receiving key 12 is advantageous to deter interception of the security code. Furthermore, a tight spacing between key 12 and locking mechanism 18 serves to consistently align the array of reflected surfaces 16 with the line of sight reader 20 so that optics may be utilized to read the pattern.

Figure 4:
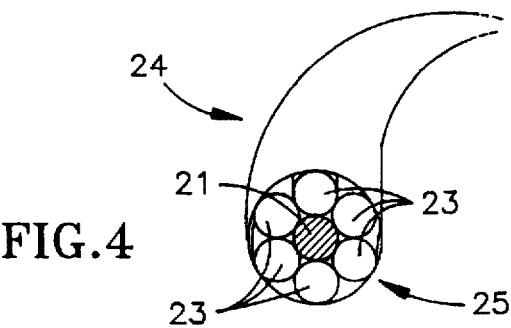
FIG. 4 illustrates an enlarged view of a second aspect of the present invention.

Referring to FIG. 4, tip 25 of fiber optic cable 24 of the preferred embodiment of the present invention is illustrated in greater detail. Cable 24, as viewed from this perspective, comprises a number of outer optical fibers 23 surrounding the outer periphery of an inner optical fiber 21. Inner optical fiber 21 functionally transmits a light beam generated by a light source (not shown), such as a light emitting diode, onto the array of reflected surface of key 12. Correspondingly, outer optical fibers 23 receive the light reflected by array 16 and transmit these reflections to a light detector (not shown), such as a PIN diode, for measuring the reflected light.

Fibers 21 and 23 preferably comprise plastic construction. Nonetheless, glass fibers may also be used. Preferably, a light wavelength of 0.85 μm is utilized in conjunction with fiber diameters between 300 μm and 1 mm. The transmitted light is preferably intensity modulated comprising a data transmission rate of less than 2 megabytes per second.

Functionally, fiber optic cable 24 couples the array of reflective surfaces 16 with a light source through a inner optical fiber 21, and the resultant reflections with a light detector by means of outer optical fibers 23. However, in an alternate embodiment of the present invention, fiber optic cable 24 is substituted with a single fiber optic for both transmitting and receiving light from the light source and the light detector, respectively. Using this scheme, an optical direction coupler is spliced onto the fiber, with a portion thereof oriented at an acute angle and an end of the fiber forming both a transmitting tip and a receiving tip. By this arrangement, a "Y" connector is created therefrom for splicing into the main optical fiber to refract light received from the receiving tip, or transponder read head for detection by the light detector. The transmitting tip, or main tip provides the light source for illuminating the array of reflective surfaces 16 by means of the light source. Thus, the "Y" splice connector is a directional coupler, and as such, may be replaced by a prism.

Figure 5:
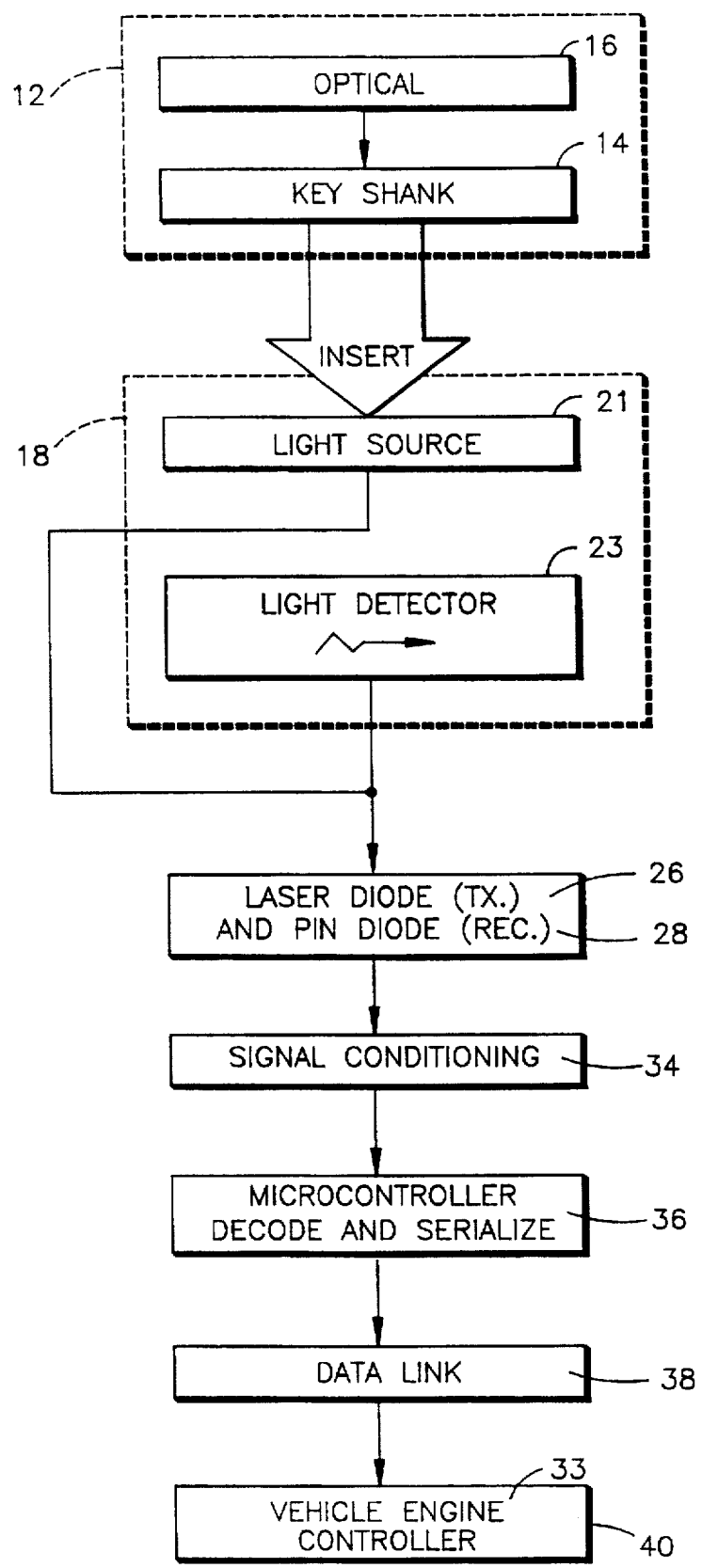
FIG. 5 illustrates a block diagram of the preferred embodiment of the present invention.

Referring to FIG. 5, a block diagram for passive optical anti-theft system 10 of the present invention is illustrated. Key 12 having an array of reflective surfaces 16 on a shank 14 is inserted into a locking mechanism 18. Locking mechanism 18 comprises a directional light source 21, preferably comprising a laser diode, for illuminate the array of reflective surfaces 16 and a directional light detector 23, preferably comprising PIN diode, for detecting the intensity of the reflections resulting from the illuminated array. Reflected light in the form of a signal is then conditioned through a series of operational amplifiers to quantize the reflected signals into three distinguishable levels. Each of the detected signal levels are subsequently input into a microcontroller in a microcontroller block 36 where they are decoded and serialized. Finally, the serialized sequential string of detected signals, as identified by the microcontroller, are transmitted via a data link block 38 for enabling/disabling or latching/unlatching to a vehicle engine controller 33 in one embodiment. As a consequence, protection of the proper sequence of signals produces activation of engine controller 33 which allows for a keyed ignition startup of a vehicle.

Figure 6:
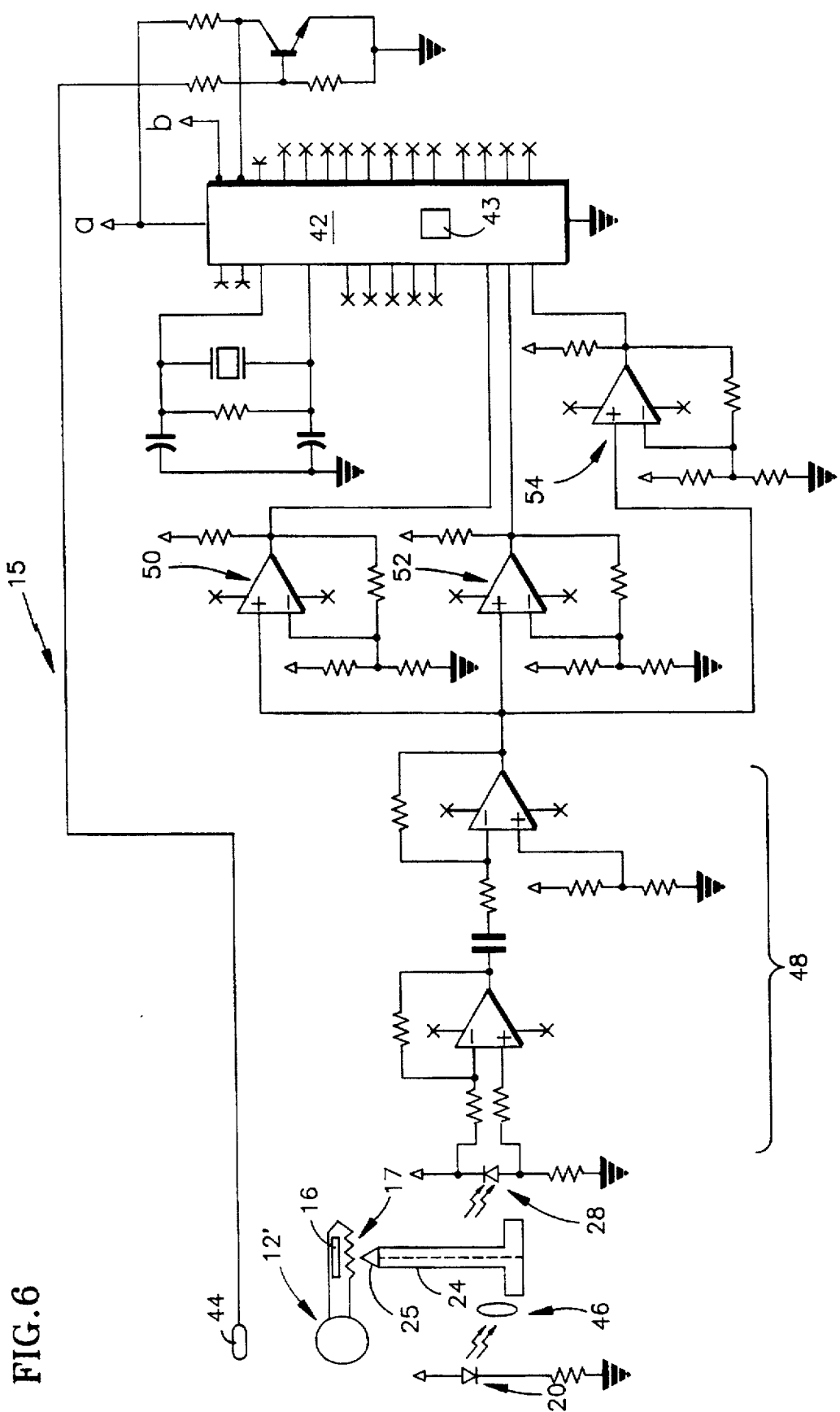
FIG. 6 is a schematic diagram of a preferred control circuit of the present invention.

Referring to FIG. 6, a schematic diagram of a preferred control circuit of the present invention is illustrated. As detailed herein, the passive optical anti-theft system reads the plurality of reflective surfaces 16 placed on a key shank 14 as the key is inserted into a lock cylinder or mechanism 18.

Further, a proximity detector 44, such as a strain-gage based contact switch, for example, is incorporated for detecting insertion of key 12 into lock cylinder 18. Proximity detector 44, as a result, enables light source 26 once the key 12 is inserted into the lock cylinder 18. Light source 26, preferably realized by a laser or light emitting diode 26, generates a constant light having a specific wavelength of approximately 0.85 μm. A lens 46 is preferably included between the light source and the end of the transmitting fiber 21 adjacent the light source for focusing light travelling along the fiber. As light is reflected off the key 16, it is modulated accordingly. In this application, loss of light from the source is substantially negligible since the length of fiber preferably used is far less than 1.5 meters in total length.

The passive optical anti-theft system additionally comprises a light detector 28, preferably a photodiode or PIN diode, for receiving the reflected and modulated light from the plurality of reflected surfaces of key 12. PIN diode 28 generates an output electrical signal directly proportional to the intensity of light.

The output characteristics of PIN diode 28 fall within a substantially low voltage range. However, as microcontroller 42 requires input values over a higher voltage range, signal conditioning circuitry is required. This circuitry elevates the voltage output level of PIN 28 to effectively raise the signal level to a +5 volt range. In so doing, microcontroller 42 may functionally interface and electrically operate with PIN diode 28.

The above signal conditioning circuitry is realized by several components. First, an amplifier, or gain stage 48 is incorporated to boost the output of diode 28 from a low noise floor into discernible output level. Amplifier 48 preferably comprises a standard amplifier having a bandwidth of approximately 100 KHz or lower, and is constructed from discrete components, such as, for example a single stage bipolar junction transistor ("BJT") or field effect transistor ("FET") amplifier. A standard operational amplifier having the required bandwidth may also be utilized in the alternative.

Further, the signal conditioning circuitry comprises a second gain stage. This second stage comprises three different level detectors, or comparators 50, 52 and 54, respectively. Each of the level detectors 50, 52 and 54, detect a particular light intensity level —a first for triggering a logic high output, a logic low, and an off position —and generate a corresponding detection signal. It should be noted, however, that comparators 50, 52 and 54, may also be replaced with an analog to digital converter for measuring voltage levels and generating a quantized output reflecting accordingly. This approach, while still a viable alternative, will be more costly and may be slow the speed of signal detection.

In operation, microcontroller 42 monitors each of the outputs of comparators 50, 52 and 54 input thereto. The order or sequence of changes to the voltage levels is logged into a microcontroller memory 43, preferably comprising an electrically erasable programmable read only memory ("EEPROM"). Once logged, the data is compared to a preset code also stored in memory 43, preferably in firmware. The preset security code may be changed or updated by the factory or service center to represent the vehicle keys such that both key and receiver need not be shipped as a single unit. This is of particular concern when keys are either lost and/or need to be replaced.

In response to the detection of a valid security code from the key 12, microcontroller 42 generates a control signal. In one embodiment, this control signal is transmitted to a vehicle engine controller to allow a normal engine starting sequence to initiate. The passive optical anti-theft system is preferably located in the engine controller such that the optical fiber bundle 24 extends between the lock cylinder and the engine controller module to insure a secure data transmission link. In the alternative, a vehicle serial data bus may be used for transmitting information between the system the vehicle engine controller module. However, this arrangement may be more easily compromised.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. Thus, for example, it should be apparent to one of ordinary skill in the art that the anti-theft system of the present invention may be applied in conjunction with enclosed spaces requiring security such as a vehicle, door, building entrance, safe, desk drawer or jail cell, and the like. Similarly, the invention detailed herein may be applied as a turnkey system, such as for a vehicle steering column ignition switch, for example. The invention detailed herein is, hence, applicable to other secured enclosed spaces or secured switching mechanisms requiring security for deterring theft. Moreover, the present invention is also applicable to key formats requiring the storage of personal or secured information thereon. It is therefore contemplated that the appended claims will cover any such modifications or embodiments as fall within the true scope of the invention.

All of the U.S. Patents cited herein are hereby incorporated by reference as if set forth in their entirety.

What is claimed is:

1. An optical anti-theft system having a security code, said optical anti-theft system comprising:

a member having a plurality of reflective surfaces on a single track, each reflective surface of said plurality of reflective surfaces having a reflectivity corresponding with a depth, said plurality of reflective surfaces having a pattern corresponding with the security code; and a base for cooperating with said member, said base comprising:

a light source for generating a light beam to illuminate said plurality of reflective surfaces; and a light detector for sensing said illuminated plurality of reflective surfaces and for initiating a security function in response to said sensed illuminated plurality of reflective surfaces having said pattern corresponding with the security code.

2. The system of claim 1, wherein said plurality of reflective surfaces comprises:

a first reflective surface for reflecting said light beam at a first reflectivity, said first reflective surface having a first depth and representing a first logic level; and a second reflective surface for reflecting said light beam at a second reflectivity, said second reflective surface having a second depth and representing a second logic level.

3. The system of claim 2, wherein said plurality of reflective surfaces further comprises:

a third reflective surface for reflecting said light beam at a third reflectivity, said third reflective surface having a third depth and representing an off position to insure said illuminated plurality of reflective surfaces are correctly sensed by said light detector.

4. The system of claim 1, wherein said plurality of reflective surfaces are formed on a reflective substrate comprising polished aluminum or a machined material having portions with at least a first and a second reflectivity.

5. The system of claim 4, wherein said plurality of reflective surfaces are ground into said machined material at different depths to vary the distance between said plurality of reflective surfaces and said light detector.

6. The system of claim 1, wherein said plurality of reflective surfaces are formed on a substrate by photolithography, etching, holographic recording, polishing, painting, or attaching a data strip having at least a first and a second reflectivity superjacent said substrate.

7. The system of claim 1, further comprising:

a comparator for comparing said sensed illuminated plurality of reflective surfaces with the security code, and for initiating a control signal to initiate said security function in response to said sensed illuminated plurality of reflective surfaces matching the security code.

8. The system of claim 1, wherein said member comprises a key, and said base comprises a lock for receiving said key such that said key latches and unlatches said lock.

9. The system of claim 8, wherein said lock is a vehicle door lock, a vehicle ignition lock, a vehicle engine controller switch, vehicle starter switch, or a building door lock.

10. The system of claim 1, wherein said security function comprises arming an alarm, disarming said alarm, latching a lock or unlatching said lock.

11. A optical anti-theft system having a security code for securing a vehicle, said optical anti-theft system comprising:

a key having a substrate and an array of reflective surfaces formed within a single track on said substrate, each reflective surface of said array of reflective surfaces having a reflectivity corresponding with a depth and forming a pattern corresponding with the security code; and a lock for receiving said key such that said key latches and unlatches said lock, said lock comprising:

a light source for illuminating said array of reflective surfaces; and a light detector for sensing said illuminated array of reflective surfaces and for initiating a security function in response to the sensed illuminated array of reflective surfaces having said pattern corresponding with the security code.

12. The system of claim 11, wherein said light source comprises a light emitting diode.

13. The system of claim 11, wherein said light source comprises:
an optical fiber for coupling said light source with said array of reflective surfaces.

14. The system of claim 11, said light detector comprises a PIN diode.

15. The system of claim 11, wherein said light detector comprises:
an optical fiber for coupling said light detector with said illuminated array of reflective surfaces.

16. The system of claim 11, wherein the security code comprises a vehicle identification number.

17. The system of claim 16, wherein said light detector comprises:
a microcontroller for comparing said sensed illuminated array of reflective surfaces with said vehicle identification number, and for generating a control signal to initiate said security function in response to said sensed illuminated array of reflective surfaces matching the vehicle identification number.

18. The system of claim 11, wherein said array of reflective surfaces comprises:
a first reflective surface for reflecting said light beam at a first reflectivity, said first reflective surface representing a first logic level;
a second reflective surface for reflecting said light beam at a second reflectivity, said second reflective surface representing a second logic level; and
a third reflective surface for reflecting said light beam at a third reflectivity, said third reflective surface representing an off position to insure said illuminated array of reflective surfaces are correctly sensed by said light detector.

19. The system of claim 11, wherein said array of reflective surfaces are formed on a reflective substrate comprising a polished aluminum or a machined material having portions with at least a first and a second reflectivity.

20. The system of claim 19, wherein said plurality of reflective surfaces are ground into said machined material at different depths to vary the distance between said plurality of reflective surfaces and said light detector.

21. The system of claim 11, wherein said array of reflective surfaces are formed on a substrate by photolithography, etching, holographic recording, polishing, painting, or attaching a data strip having at least a first and second reflectivity superjacent said substrate.

22. The system of claim 11, wherein said security function comprises arming a vehicle alarm, disarming said vehicle alarm, latching a vehicle lock or unlatching said vehicle lock.

23. The system of claim 11, wherein said security code comprises supplementary user data, said supplementary user data comprising preselected seat position information, a preselected radio station, or personal user data.

24. The system of claim 11, wherein said lock is a vehicle door lock, a vehicle trunk lock, or a vehicle ignition lock.

25. A passive optical anti-theft system having a security code for securing a vehicle, said system comprising:
a key having a linear array of reflective marks positioned along a single track for reflecting light, each of said reflective marks of said linear array of reflective marks having a reflectivity corresponding with a depth and forming a pattern corresponding with the security code and comprising:
a first reflective surface for reflecting light at a first reflectivity, said first reflectivity having a first depth and representing a first logic level; and
a second reflective surface for reflecting light at a second reflectivity, said second reflectivity having a second depth and representing a second logic level;
a lock for receiving said key such that said key latches and unlatches said lock, said lock comprising:
a directional light source for projecting light at said linear array of reflective marks of the key, said directional light source comprising:
a light emitting diode for generating a directional light beam; and
an optical fiber cable having a first optical fiber for coupling said light emitting diode with said linear array of reflective marks when said key is positioned within said lock;
a directional receiver for optically detecting said reflectivities of each reflective mark of said linear array to provide a detected signal, said directional receiver comprising:
a light sensor for sensing a light intensity for each reflective mark of said linear array; and
said optical fiber cable having a second optical fiber for coupling said illuminated array of reflective surfaces with said directional receiver; and
a microcontroller for comparing said detected signal with a stored signal, and for transmitting an activation signal in response to said detected signal matching the stored signal.

26. The system of claim 25, wherein said linear array of reflective surfaces further comprises:
a third reflective surface for reflecting light at a third reflectivity, said third reflectivity having a third depth and representing an off position to insure said array of reflective surfaces are correctly sensed by said directional receiver.

\* \* \* \* \*